(12) United States Patent
Nielsen et al.

(10) Patent No.: US 6,249,253 B1
(45) Date of Patent: Jun. 19, 2001

(54) MOBILE RADIOTELEPHONE DETERMINATION USING TIME OF ARRIVAL OF GPS AND PILOT SIGNALS

(75) Inventors: Jorgen S. Nielsen, Calgary; Leo Strawczynski, Ottawa, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/290,623

(22) Filed: Apr. 13, 1999

(51) Int. Cl.[7] .............................. G01S 5/02; H04B 7/185; H04B 7/216
(52) U.S. Cl. .............. 342/463; 342/357.06; 342/357.08; 342/357.09; 342/450; 375/130; 375/140; 455/403; 455/422; 455/456; 370/328; 370/329; 370/335; 370/342
(58) Field of Search ...................... 342/357.01–357.17, 342/385, 387, 450–465; 375/130, 131, 140; 370/315, 316, 319, 320, 328, 329, 335, 342; 455/403, 422, 456, 457

(56) References Cited

U.S. PATENT DOCUMENTS

| | | | |
|---|---|---|---|
| 5,614,914 | * | 3/1997 | Bolgiano et al. ................. 342/457 X |
| 5,646,632 | * | 7/1997 | Khan et al. ....................... 342/457 X |
| 5,859,612 | * | 1/1999 | Gilhousen ............................ 342/457 |
| 5,900,838 | * | 5/1999 | Khan et al. ............................ 342/457 |
| 5,982,324 | * | 11/1999 | Watters et al. .................... 342/357.06 |
| 6,034,635 | * | 3/2000 | Gilhousen ............................ 342/457 |
| 6,081,229 | * | 6/2000 | Soliman et al. ................. 342/357.05 |

* cited by examiner

Primary Examiner—Bernarr E. Gregory
(74) Attorney, Agent, or Firm—John D. Crane (57) ABSTRACT

The time of arrival of a global positioning system signal and the time of arrival of a code division multiple access pilot signal, from a base station, are estimated at a mobile radiotelephone. Both estimates are performed relative to a local clock in the radiotelephone. These signals are calibrated for the time delay produced by the transmitter at the base station and the time delay produced by the receiver in the radiotelephone.

7 Claims, 5 Drawing Sheets

MOBILE RADIOTELEPHONE DETERMINATION USING TIME OF ARRIVAL OF GPS AND PILOT SIGNALS

BACKGROUND OF THE INVENTION

I. Field of the Invention

The present invention relates to radio communications. More particularly, the present invention relates to determining the position of a mobile radiotelephone using the time of arrival estimates for GPS and CDMA pilot signals.

II. Description of the Related Art

The Global Positioning System (GPS) is a space based, radio-positioning and time transfer system. The system was originally developed primarily for military purposes but is now used extensively in civilian applications as well.

GPS provides accurate position, velocity, and time information for a given object anywhere on the earth. Twenty-four GPS satellites, arranged in six orbital planes, transmit radio frequency ranging codes and navigation data messages. The navigation messages include such data as satellite clock-bias data, ephemeris data, certain correction data, and the course orbital data on the twenty-four satellites.

Generally, the satellites transmit ranging signals on two D-band frequencies. The satellite signals are transmitted using spread-spectrum techniques, employing ranging codes as spreading functions. These spreading functions consist of a 1.023 MHz coarse acquisition (C/A) code and a 10.23 MHz precision code. The codes are designed to minimize the probability that a receiver will mistake one code for another (i.e., minimize cross correlation).

The ranging codes broadcast by the satellites enable the GPS receiver to measure the transit time of the signal and thereby determine the range between the satellite and the receiver. Typically, four GPS satellites must be in clear view of the receiver in order for the receiver to accurately determine its location. The measurements from three GPS satellites allow the GPS receiver to calculate the three unknown parameters representing it's three-dimensional position. The fourth satellite allows the GPS receiver to calculate the user clock error that is generally unknown.

A common problem with the conventional GPS is not having four GPS satellites in clear view of the GPS receiver. This typically arises in a city setting in the shadow of a group of tall buildings. In such situations, the GPS receiver is unable to accurately determine its location using GPS.

Additionally, even when four satellites are in view, there are further errors that result in erroneous position determinations. These errors include physical errors such as signal path delays through the atmosphere (i.e., propagation signal delay and satellite clock and ephemeris errors). Also, the government introduces errors for national security reasons that include ephemeris data error and clock error.

To reduce the effects of these errors, a differential GPS (DGPS) system may be used. Typical DGPS architecture includes one or more reference stations at precisely known, fixed reference sites, and DGPS receivers. The reference station includes a reference receiver antenna, a differential correction processing system, and data link equipment.

There are two primary variations of the differential measuring techniques. Both techniques are well known in the art.

The typical DGPS presents certain drawbacks. One is that the DGPS must use it own frequency band so as not to interfere with that of the stand alone GPS. In addition, the DGPS receiver presents an additional receiver that must operate independently of the GPS receiver in receiving the differential correction data. This goes against the industry trend to make electronics smaller and cheaper.

The present invention is also related to cellular technology. A typical cellular network is comprised of a number of cells covering a geographical area. Each cell has a base station that maintains communication with a mobile or stationary radiotelephone. The base station includes a transmitter, a receiver, and an antenna that transmits a wireless signal over the area. The transmit power of the base station is directly related to the size of the cell such that the larger the cell, the greater the transmit power of the base station.

The overall management of the cellular system is handled by a mobile telecommunications switching office (MTSO). The MTSO provides numerous functions for the cellular system, such as assigning calls to a cell based on availability and signal strength, call statistics, and billing for the network. The MTSO also functions as the interface between the cells and the public switched telephone network (PSTN).

The cellular base stations receive the GPS clock signals. Using this information, all the base stations within a geographical area are synchronized together since they are all locked to the common GPS clock.

In a code division multiple access (CDMA) cellular system, each base station transmits a pilot signal at all times. The pilot signal tells the radiotelephones which base station they are receiving and synchronizes the radiotelephones with that base station. The CDMA system is well known in the art.

The United States Federal Communication Commission is requiring that all mobile network service providers add a mobile caller location feature by October 2001. This feature should be able to locate the mobile with an accuracy of 125 meters RMS throughout their coverage area.

Figure 1:
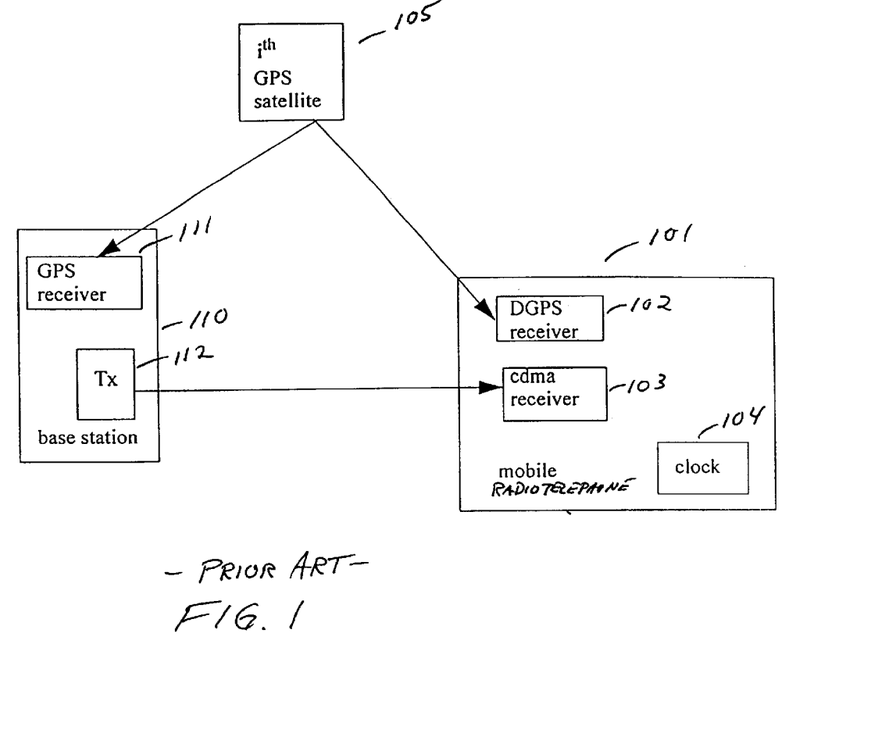
FIG. 1 shows a block diagram of a prior art cellular location system using GPS.

FIG. 1 illustrates a prior art method for determining the location of a mobile radiotelephone (101) using a GPS satellite (105). The figure shows a mobile radiotelephone (101) comprising a DGPS receiver (102) that receives the GPS satellite signal. The mobile radiotelephone (101) also has a CDMA receiver (103) for receiving a pilot signal from the CDMA base station (110).

The base station (110) is comprised of a GPS receiver (111) for receiving the synchronizing clock signal from the GPS satellite (105). The base station (110) also has a transmitter (112) for transmitting the pilot signal to the mobile radiotelephone (101).

Referring to FIG. 1, the measured time of arrival (TOA) of the $i^{th}$ GPS signal is denoted as $T_{m,gps,i}$ and is given by:

$$T_{m,gps,i} = T_{sat,m,i} + T_{rx,gps} + T_{clk,gps}$$

where:

$T_{sat,m,i}$ is the differential propagation time between the $i^{th}$ GPS satellite, the serving base station and the mobile radiotelephone. It depends only on the position of the radiotelephone relative to the serving base station. The satellite position is assumed to be sufficiently accurately known via the navigation data from the ephemeris data decoded at the base station;

$T_{rx,gps}$ is the unknown delay through the radiotelephone receiver for the GPS signals; and $T_{clk,gps}$ is the clock error or the radiotelephone for the GPS signals. Likewise, the TOA of the $i^{th}$ CDMA pilot signal is denoted by $T_{m,cdma,i}$ and is given by:

$$T_{m,cdma,i} = T_{b,m,i} + T_{tx,cdma,i} + T_{rx,cdma} + T_{clk,cdma}$$

where:

$T_{b,m,i}$ is the propagation time between the $i^{th}$ base station and the mobile.

$T_{tx,cdma,i}$ is the unknown delay through the $i^{th}$ base station transmitter for the CDMA signals;

$T_{rx,cdma}$ is the unknown delay through the mobile receiver for the CDMA signals; and $T_{clk,cdma}$ is the clock error for the mobile for the CDMA signals.

If only the DGPS signals are considered, the unknowns are $T_{sat,m,i}$, $T_{rx,gps}$, and $T_{clk,gps}$. Since $T_{rx,gps}$ and $T_{clk,gps}$ are not separable, $T_{rx,gps} + T_{clk,gps}$ is treated as a single unknown. $T_{sat,m,i}$ is dependent on the $\{x, y, z\}$ coordinates of the radiotelephone. Hence, there are a total of four unknowns to be found, thus requiring four satellites be in view simultaneously.

The CDMA pilot signals are considered next. The unknowns are $T_{b,m,i}$, $T_{tx,cdma,i}$, and $(T_{rx,cdma} + T_{clk,cdma})$. The difference between the CDMA pilot signals and the GPS signals is that we have an additional unknown for each base station transmitter (i.e., $T_{tx,cdma,i}$).

The problem with the location process of FIG. 1 is that there is no practical method for calibrating the unknown variables $T_{tx,cdma,i}$ and $T_{rx,cdma}$. Therefore, the TOA measurements of the pilots cannot be directly used to augment the DGPS solution. Additionally, since the GPS and CDMA signals are processed through different channels in the radiotelephone, errors occur due to the separate channels drifting randomly with time and temperature. There is a resulting need to calibrate and compensate for these unknowns in order to provide a more accurate location mechanism.

SUMMARY OF THE INVENTION

The present invention encompasses a process for determining a location of a mobile radiotelephone. The radiotelephone comprises a transmitter and receiver for communicating radiotelephone signals. The radiotelephone also has a global positioning system (GPS) signal receiver and a local clock.

The radiotelephone operates in a radiotelephone system that comprises a plurality of base stations. Each base station comprises a transmitter and receiver for communicating radiotelephone signals with the mobile radiotelephones in the area. The base station also has a GPS signal receiver.

The process for locating the mobile radiotelephone is comprised of estimating the time of arrival of GPS course acquisition signals at the radiotelephone's GPS receiver relative to the radiotelephone's local clock. The time of arrival of a radiotelephone system pilot signal at the radiotelephone's receiver is also estimated. This is also done relative to the radiotelephone's local clock.

Delays through the base station's transmitter and the radiotelephone's receiver are determined. Finally, the time of arrival values are calibrated and compensated for the base station's transmitter delay and the radiotelephone's receiver delay. The calibration and compensation process of the present invention provides a more accurate position estimate for the mobile radiotelephone.

DETAILED DESCRIPTION OF THE PREFERRED EMBODIMENT

The present invention provides a practical apparatus and process for differential calibration of and compensation for the unknown variables $T_{tx,cdma,i}$ and $T_{rx,cdma}$. These are the time delays through the $i^{th}$ base station transmitter for CDMA signals and the mobile radiotelephone receiver for the CDMA signals, respectively. Knowing and compensating for these variables provides a more accurate determination of the mobile radiotelephone's location using time of arrival (TOA) of GPS and CDMA pilot signals.

Figure 2:
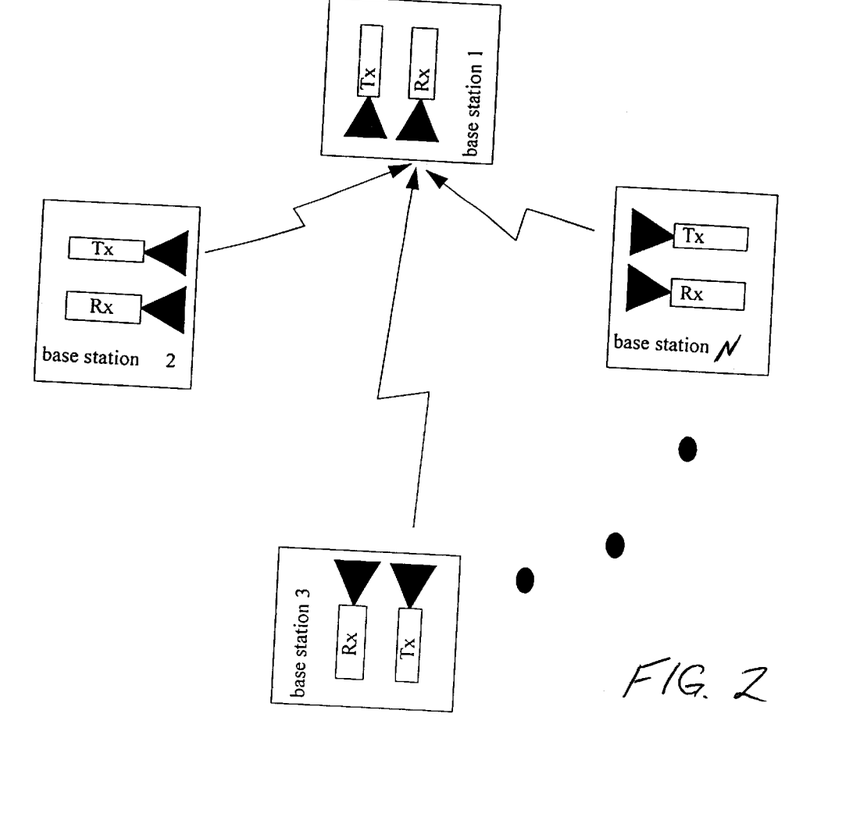
FIG. 2 shows a block diagram of q base stations.

FIG. 2 illustrates n base stations, numbered "1" through "N". Each base station has a receiver/transmitter pair that can exchange signals as shown in the figure. The delays associated with this system are:

$D_{tx}(n)$ = the delay through the $n^{th}$ base station transmitter.

$D_{rx}(m)$ = the delay through the $m^{th}$ base station receiver.

$P(n,m)$ = the propagation delay from the $m^{th}$ to the $n^{th}$ base station.

$D(n,m)$ = the total measured delay from the $m^{th}$ transmitter to the $n^{th}$ receiver.

Referring to FIG. 2 and assuming that base station "n" transmits a signal that is received by base station "m", the total delay is then given by:

$$D(m,n) = D_{tx}(n) + P(n,m) + D_{rx}(m).$$

The calibration process of the present invention then steps through all the permutations of n and m from 1 to N, excluding the cases where m=n. From the total of N(N−1) TOA measurements of the calibration signals, the differential delays through the base station transmitters are estimated. These differential time delay measurements are formed as:

$$D(m,n) - D(q,n) = P(m,n) - P(q,n) + D_{rx}(m) - D_{rx}(q).$$

Note that the unknown time delay through the transmitter has disappeared. The quantity $(D(m,n) - D(q,n))$ is measured as the relative time difference of arrival (TDOA) of the transmission from base stations "m" and "q" to base station "n". The quantity $(P(m,n) - P(q,n))$ is the differential propagation delays between base stations that are assumed to be known.

Finally, the equations are formulated as:

$$D_M - P_D = Q_R R.$$

where $D_M$ is the measurement vector of the $N(N-1)(N-2)/2$ independent differential measurements $D(m,n) - D(q,n)$;

$P_D$ is the vector of all the differential delays $P(m,n) - P(q,n)$; and

R is determined by $(Q_R^T C^{-1} Q_R)^{-1} Q_R^T C^{-1} (D_M - P_D)$ where T denotes transpose and C is the covariance matrix of the uncertainty in the TDOA measurements of the vector $D_M$.

Figure 3:
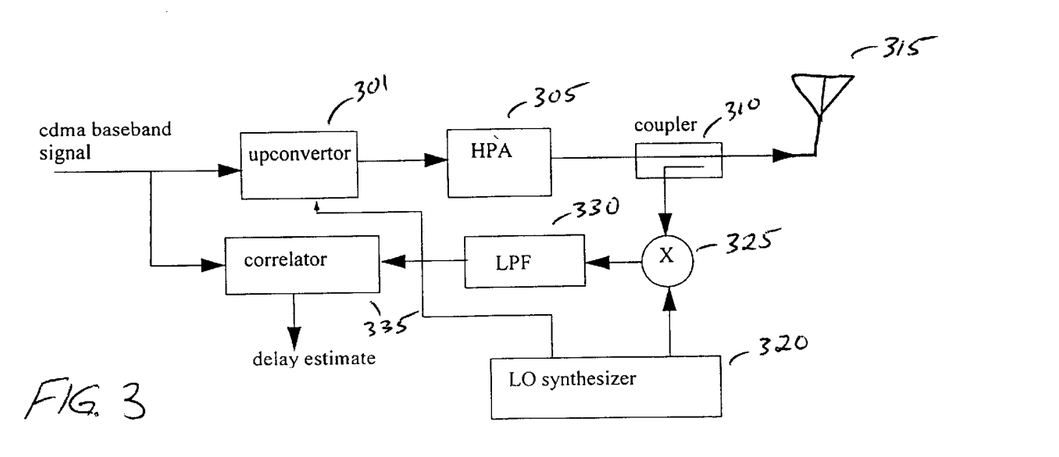
FIG. 3 shows a block diagram of a delay monitor apparatus in accordance with the CDMA transmitters of FIG. 2.

The preferred embodiment of the delay monitor apparatus of the present invention, illustrated in FIG. 3, is applied to the base station transmitter such that $T_{tx,cdma,i}$ can be determined. In this apparatus, the CDMA baseband signal is up-converted to a higher frequency by the up-converter (301). The high power amplifier (HPA) (305) amplifies the up-converted signal. The amplified signal is input to the antenna (315) through the coupler (310).

In order to determine the delay through the up-converter and HPA, a feedback path is provided. The transmitted signal is coupled back through the coupler (310) and down-converted to a baseband signal by a mixer (325) coupled to a local synthesizer (320).

The baseband signal is low pass filtered (330). This filter (330) is assumed to not add any significant unknown delays. The filtered signal is then correlated (335) with the initial up-conversion signal.

The correlation process (335) results in the delay estimate that is an estimate of $T_{tx,cdma,i}$. Clearly, the estimate of $T_{tx,cdma,i}$ can be used in a feedback control loop to control $T_{tx,cdma,i}$.

In order to use CDMA pilot signals in an absolute sense, it is necessary to know the difference in the delays of the GPS and the CDMA signals of the mobile radiotelephone receiver. In the preferred embodiment, this is determined by the narrow-band filtering portion of the receiver being common to both the GPS and the CDMA signals. The apparatus illustrated in FIG. 4 achieves this commonality.

Figure 4:
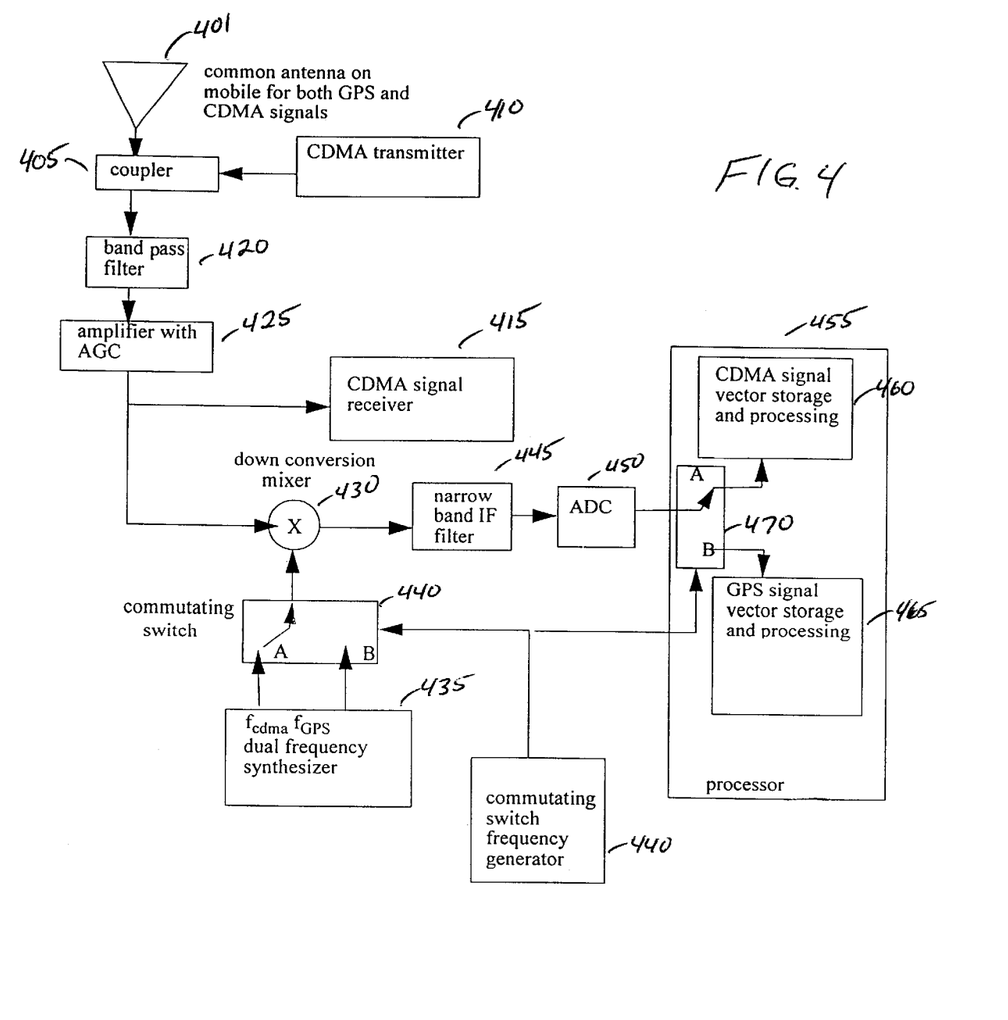
FIG. 4 shows a block diagram of a CDMA/GPS commutating receiver apparatus with a common antenna.

Referring to FIG. 4, both the CDMA RF signal and the GPS RF signal enter the receiver through a common antenna (401). The antenna (401) is a dual frequency antenna that is sensitive at both the GPS and the CDMA carrier frequencies.

Alternate embodiments of the apparatus of the present invention use dual antennas to accomplish the same results. This embodiment is discussed subsequent to the present embodiment.

The output of the antenna (401) is fed to a coupler (405) that has ports connecting both the CDMA transmitter (410) and receiver (415) paths. The intercepted CDMA and GPS signals propagate to the dual band, band-pass filter (BPF) (420).

In the preferred embodiment, the BPF (420) is a roofing-type filter with bands around the GPS and CDMA carrier frequencies. The BPF is not particularly narrow and hence does not have significant group delay associated with it. The reason for the BPF, in this embodiment, is only to avoid intermodulation distortion in the amplifier and the down-conversion mixer by strong out-of-band interference signals.

The received signal is also coupled into the normal CDMA receiver (415) through an automatic gain control (AGC) amplifier (425). The amplifier with AGC (425) controls the noise figure of the overall receiver.

The CDMA/GPS signal is down-converted to an intermediate frequency (IF) by the mixer (430). The IF is common to both the GPS and the CDMA signals and is implemented by using two distinct local oscillator frequencies. These frequencies are denoted $f_{CDMA}$ and $f_{gps}$.

A dual frequency synthesizer (435) and a commutating switch (440) generate the local oscillator frequencies. Hence the signal in the IF filter is alternately the CDMA signal and the GPS signal. The IF signal is the CDMA signal when the switch is in position A such that $f_{CDMA}$ is connected to the mixer. The IF signal is the GPS signal when the switch is in position B such that $f_{GPS}$ is connected to the mixer.

Figure 5:
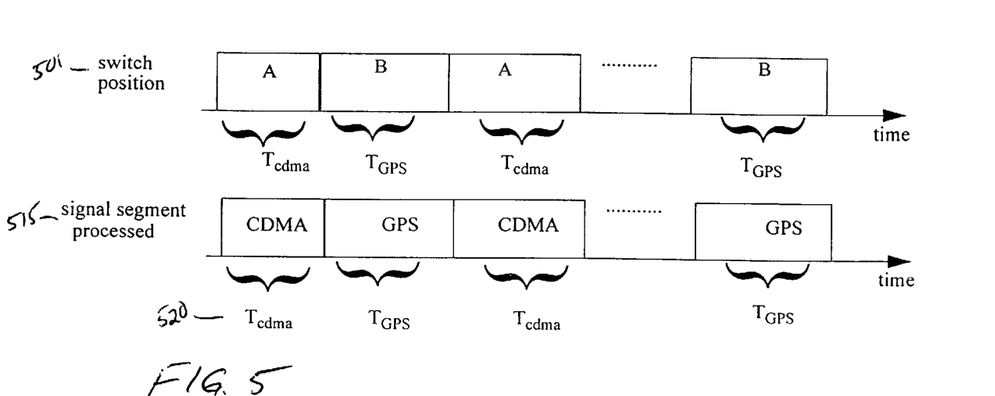
FIG. 5 shows a commutated data stream in accordance with the apparatus of FIG. 4.

FIG. 5 illustrates the above-described commutation of the data. The switch position (501) is alternately changed between positions A and B. This causes the CDMA and GPS signals (515) to be alternately sampled into the processor. The dwell time (520) is $T_{CDMA}$ when the CDMA signal is being processed and $T_{GPS}$ when the GPS signal is being processed.

The commutated GPS/CDMA IF signal then passes through the narrowband IF filter (445). The IF filter (445) has a bandwidth of 1.25 MHz in the preferred embodiment. This is the ideal bandwidth for CDMA and approximately the bandwidth of the GPS (C/A) acquisition signal.

The signal output from the IF filter (445) is digitized by the analog-to-digital converter (450) and passed to the digital signal processor (DSP) (455). The processor (455) stores the CDMA and GPS signal segments in separate memory arrays (460 and 465). This is illustrated by using a commutating switch (470) that is the complement of the first commutating switch (440).

The commutating switches (440 and 470) are for illustration purposes only. The switching function may be implemented by using switches, a DSP, a microprocessor, or any other device that performs the same function.

The CDMA processing of the DSP (455) then determines the TOA of the CDMA pilot signals relative to the receiver's local clock. Likewise, the GPS processing of the DSP (455) determines the TOA of the GPS signals relative to the same local clock. The CDMA processing and the GPS processing are illustrated in the flowcharts of FIGS. 6 and 7 respectively.

The CDMA pilot signals are pseudorandom noise (PN) coded signals that repeat every 26.7 msec. Hence, $T_{CDMA}$ is chosen to coincide with this 26.7 msec.

Figure 6:
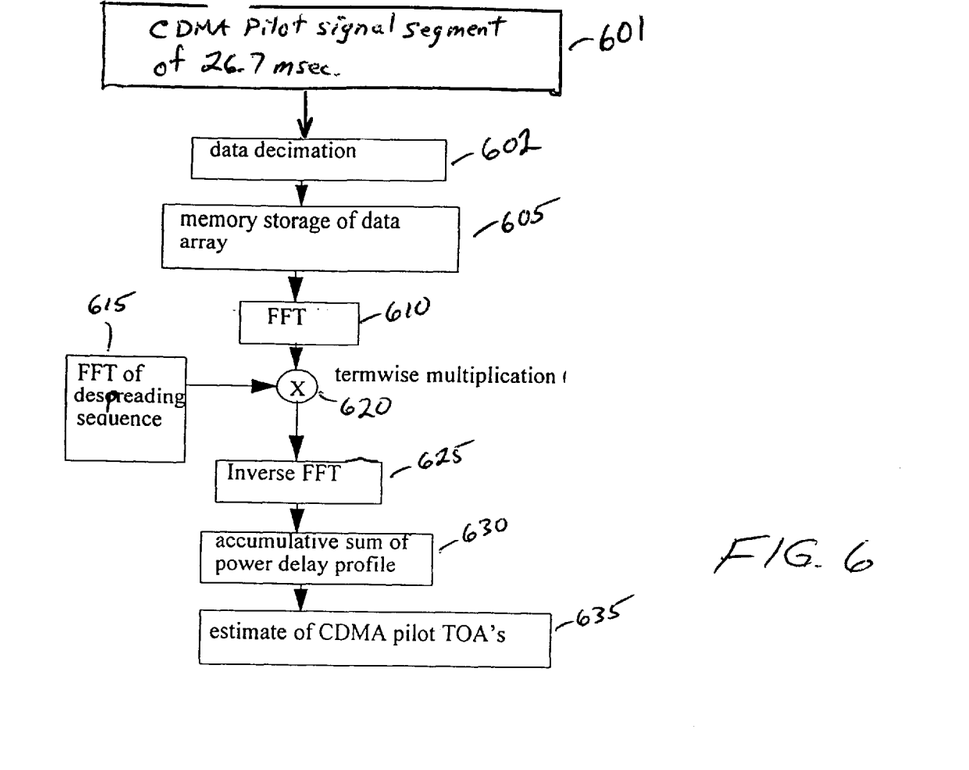
FIG. 6 shows a flowchart of CDMA signal processing in accordance with the apparatus of FIG. 4.
Figure 7:
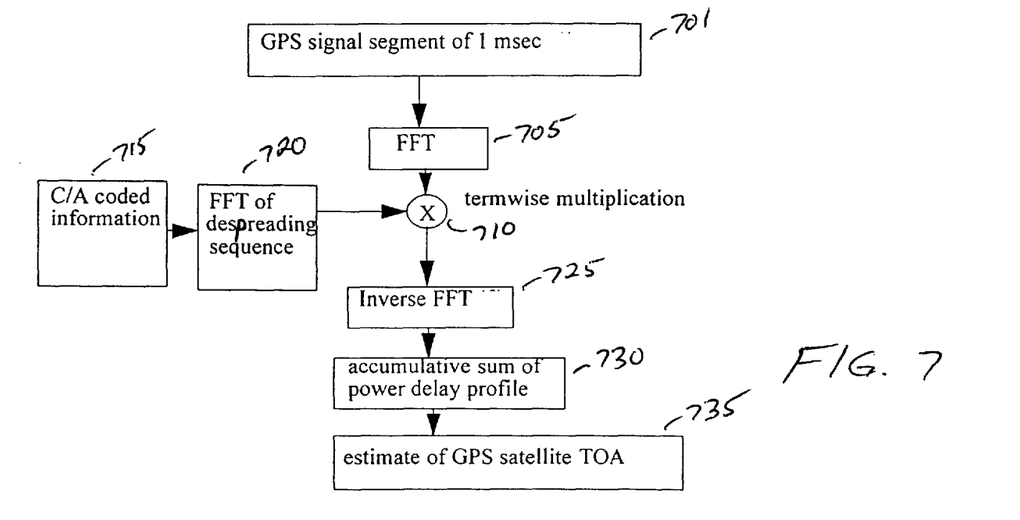
FIG. 7 shows a flowchart of GPS signal processing in accordance with the apparatus of FIG. 4.

Referring to FIG. 6, the process of the present invention to find the CDMA TOA begins by decimating the pilot frame (601) to a practical array size by using a suitable rate (step 602). In the preferred embodiment, this rate is such that the resulting array size is 4096 samples from the 26.7 msec frame. Alternate embodiments use other decimation rates. For example, the initial 1 msec portion of the pilot frame can be sampled at the CDMA chip rate to achieve similar array sizes and commensurate resolution to the GPS signal processing.

The resulting samples are stored in memory (step 605). The Fast Fourier Transform (FFT) of this array of samples is taken (step 610) and the result is multiplied (620) term-wise by a stored array (step 615). The stored array (step 615) is the FFT of the CDMA pilot signal de-spreading sequence that is decimated by the same ratio as used for the incoming signal.

The inverse FFT (step 625) is next performed on the product terms from step 615. The inverse FFT results in the cross-correlation function of the received CDMA pilot signals and the de-spreading signals. Note that since the CDMA signal contains all the visible pilot signals, this cross-correlation function is comprised of the array of peaks corresponding to the relative delays of the CDMA pilot signals as observed at the mobile.

The magnitude squared of this individual cross-correlation function coming from the inverse FFT operation (step 625) is added to the magnitude squared cross-correlation function of the previous segments (step 630) with appropriate compensation of delay such that the timing of the segments is commensurate. This results in an aggregate power delay profile from which the TOA estimate of all the CDMA pilots is possible (step 635).

It should be noted that as the coherence time of the local mobile radiotelephone clock is sufficiently long then, if the Doppler spreading of the CDMA pilot signals is not too severe, the individual inverse FFT outputs can be added on a coherent basis rather than a noncoherent basis. This eventually gives better signal-to-noise ratio(SNR) in the final aggregate power delay profile. This in turn gives a lower variance of the TOA estimate of the CDMA pilot signals.

The processing of the GPS signals is illustrated in FIG. 7. This process is similar to the CDMA pilot signal processing of FIG. 6 with two complications. First, the course acquisition signal is coded with a data rate of 50 Hz (hence the polarity of each 20 msec. frame is unknown). Second, the PN code is different for each satellite.

To minimize the processing required in the mobile radiotelephone receiver, the serving base station sends information to the mobile that includes the PN code for the visible GPS satellite and the decoded course acquisition data bits. In this way, the processing of the GPS satellites can be similar to that of the CDMA pilots except that a different despreading sequence is required for each satellite. Therefore, the measured cross-correlation function emanating from the processing corresponds to one GPS satellite rather than all of them superimposed.

Referring to FIG. 7, the processing of the GPS signals begins with using a 1 msec. GPS signal segment. Since the course acquisition code of the GPS signal is periodic every 1 msec., it is convenient to use a 1 msec data record stored in memory (step 701). The FFT of this array of samples is performed (step 705) as was done in the CDMA signals.

The result of the FFT operation (step 705) is multiplied term wise (step 710) by a stored array. The stored array is the FFT of one of the GPS satellite signals (step 715) where the CA data modulation has been appropriately removed (step 720). Also the satellite Doppler has been removed based on the information sent from the serving base station.

The inverse FFT is performed (step 725) on the product terms resulting from step (710). The inverse FFT (step 725) results in the cross-correlation function of the received GPS signal and the despreading signal. The cross-correlation function consists of an array of peaks corresponding to the relative delay of the GPS signal as observed at the mobile radiotelephone.

The magnitude squared of the individual cross-correlation functions coming from the inverse FFT operation (step 725) is taken and added to the magnitude squared of the cross-correlation functions of the previous segments (step 730). This step (step 730) is the sum of the power delay profiles and includes an appropriate compensation of delay such that the timing of the segments is commensurate. This results in an aggregate power delay profile from which the TOA estimate of the GPS satellite signal is possible (step 735). This process is repeated for all the visible GPS satellite signals.

In some embodiments of the present invention, it may be advantageous to only process the CDMA signals or the GPS signals. In such an embodiment, the processing would not be commutated between the dual CDMA and GPS sources.

Figure 8:
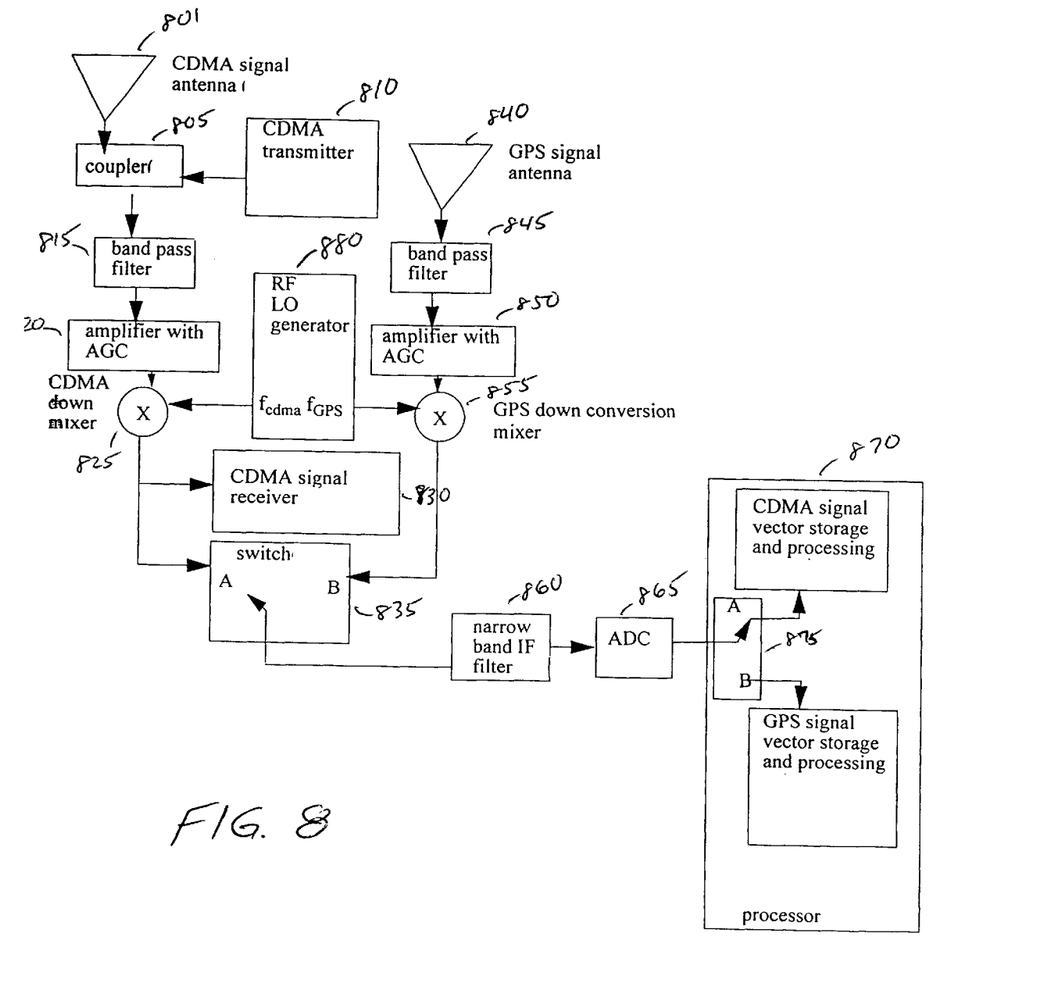
FIG. 8 shows a block diagram of a CDMA/GPS commutating receiver apparatus with dual antennas.

An alternate embodiment using two antennas, one for the GPS signals and one for the CDMA signals, is illustrated in FIG. 8. This embodiment uses a dedicated RF down-conversion stage for each signal type.

Referring to FIG. 8, the CDNA signal is received on the CDMA antenna (801) and passed through the coupler (805) to the CDMA transmitter (810). The CDMA received signal passes through the bandpass filter (815) and the AGC amplifier (820). The output of the amplifier (820) is down converted in the mixer (825) to an IF signal frequency. The down converted signal is passed to the CDMA receiver (830) and the commutating switch (835).

Likewise, in the GPS channel, the GPS signal is received on the GPS antenna (840), bandpass filtered (845) and AGC amplified (850). The amplified signal is down converted in the mixer (855) and the resulting IF signal is passed to the commutating switch (835). The commutating switches (835 and 875), dual frequency oscillator (880), narrow band IF filter (860), analog/digital converter (865) and the processor (870) all work in the same way as the single antenna approach described above. The above-described signal processing of the single antenna embodiment also applies to this alternate embodiment.

The differential calibrations of $(T_{tx,cdma,i} - T_{tx,cdma,j})$ from the processes and apparatuses of the present invention as described above are used in the following equations to mitigate the inaccuracy problem of the prior art. Taking the differential measurements of pilot signal TOAs results in the following equations.

$$T_{tx,cdma,i,j} = T_{b,m,i} - T_{b,m,j} + (T_{tx,cdma,i} - T_{tx,cdma,j}).$$

It can be seen that $T_{rx,cdma}$ and $T_{clk,cdma}$ from the above equation have now dropped out. Hence, if more than one pilot TOA is available, additional equations can be formed to improve the least squares performance of the GPS solution.

In the case where there are less than four GPS satellites visible to the mobile radiotelephone, such that CDMA pilots are required to solve for {x, y, z} of the radiotelephone. The solution is to use the DGPS TOA measurements to form equations such as:

$$T_{m,gps,i,j} = T_{sat,m,i} - T_{sat,m,j}.$$

Note that the unknown terms, $(T_{rx,gps} + T_{clk,gps})$, drop out. The following table is then the minimum number of CDMA pilot signals required for an unambiguous position estimate given the number of GPS signals that are present.

| Number of GPS Signals | Minimum Number of CDMA Pilot Signals |
| --- | --- |
| 4 | 0 |
| 3 | 2 |
| 2 | 3 |
| 1 | 4 |
| 0 | 4 |

The above table shows that if four GPS signals are available, {x, y, z} for the mobile radiotelephone can be determined without further assistance from CDMA pilots. If three GPS signals are available, two independent difference DGPS equations can be generated that are augmented with one difference CDMA pilot equation that requires two CDMA pilots. If two GPS signals are received to generate a single difference DGPS equation, two difference CDMA pilot equations requiring three CDMA pilot signals are needed. If one or less GPS signals are received, these measurements cannot be used and four CDMA pilot signals are required to achieve three independent difference equations.

Another way to mitigate the inaccuracies of the prior art, using the above-determined estimates for $T_{tx,cdma,i}$ and $T_{rx,cdma}$, is to use the CDMA pilot TOAs in absolute form rather than the differential form just discussed. This results in the pilot signals being used interchangeably with the GPS signals. This maximizes the joint data fusion potential of the CDMA pilots and the DGPS signals.

This process using the absolute TOAs is accomplished by a three step process. First, the delays of the CDMA pilot and GPS signals in the mobile receiver are made equal such that $T_{rx,cdma} = T_{rx,gps}$. In the preferred embodiment, the apparatus of FIG. 4 is used to solve this problem.

Second, the clocks from the CDMA and GPS receivers in the mobile radiotelephone must be synchronized such that $T_{clk,cdma} = T_{clk,gps}$. Since mobile radiotelephones typically use a low phase noise synthesizer to lock the CDMA pilot signals of the serving base station, the synchronizing is easily done. Also, this same timing signal can be used in the GPS receiver.

Third, the unknown transmitter time of the $i^{th}$ base station, denoted $T_{tx,cdma,i}$, is removed. In the preferred embodiment, this problem is solved by the apparatus illustrated in FIG. 3.

Using the process with CDMA pilot TOAs in absolute form, the base station CDMA pilots become equivalent to the GPS satellite signal sources and they can be used interchangeably as seen in the table below. It can be seen that there is generally one less pilot signal required to obtain a reasonable mobile position fix. In both cases, $T_{clk,cdma} = T_{clk,gps}$.

| Number of GPD Signals | Min. No. of CDMA Pilot Signals ($T_{tx,cdma,i}$ unknown) | Min. No. of CDMA Pilot Signals ($T_{rx,cdma} = T_{rx,gps}$ and $T_{tx,cdma,i}$ calibrated) |
|---|---|---|
| 4 | 0 | 0 |
| 3 | 2 | 1 |
| 2 | 3 | 2 |
| 1 | 4 | 3 |
| 0 | 4 | 4 |

In summary, there are advantages in having the mobile radiotelephone's receiver estimate the TOA of both GPS and CDMA signals simultaneously in order to achieve better location accuracy. Generally, there are more than three pilot signals visible at the mobile from three different base station locations of sufficient SNR to obtain an accurate TOA estimate. These CDMA pilot signals can behave as synchronized GPS signals. Such signals are essential to solve for the mobile location if the number of GPS satellites visible to the mobile is not sufficient. If there are enough GPS satellites visible to the mobile, the pilot signals can be used to generate additional independent equations such that the mobile position can be solved for by an overdetermined set of relations in an optimal least squares fashion.

The apparatuses and processes of the present invention provide for calibration of and compensation for the unknown variables that include the delay through the base station transmitter and the delay through the mobile receiver. Once these are calibrated for, the TOA measurements of the pilot signals can be used to directly augment the GPS solution.

We claim:

1. A method for determining a location of a radiotelephone comprising a pilot signal receiver, a global positioning system (GPS) signal receiver, and a local clock, the radiotelephone operating in a radiotelephone system comprising a plurality of bases stations, each base station comprising a pilot signal transmitter and a GPS signal receiver, the method comprising the steps of:

estimating a time of arrival of GPS signals at the radiotelephone GPS receiver relative to the radiotelephone clock;

estimating a time of arrival of a radiotelephone system pilot signal at the radiotelephone signal receiver relative to the radiotelephone clock; and calibrating the time of arrival values in response to delays associated with the base station's pilot signal transmitter and the radiotelephone's pilot signal receiver.

2. A method for determining differential time delays through pairs of base station transmitters in a radiotelephone system comprising a plurality of base stations, the method comprising the steps of:

a first pair of base station transmitters, of the plurality of base stations, each transmitting a signal to a common receiver;

the common receiver receiving each of the pair of transmitted signals;

determining, at the common receiver, a transmission delay of each signal of the received pair of signals; and determining a difference between the transmission delays of each of the received signals of the pair of received signals, the difference being the time delay through the first pair of base station transmitters.

3. The method of claim 2 and further including repeating the steps for all pairs of base station transmitters that communicate to the common receiver.

4. A method for determining a time of arrival, at a receiver, of a received code division multiple access (CDMA) pilot signal, the time of arrival being determined relative to the receiver's local clock, the radiotelephone signal comprising a plurality of frames, the method comprising the steps of:

decimating each frame of the plurality of frames at a predetermined rate to generate pilot signal samples;

performing a Fast Fourier Transform on the pilot signal samples;

decimating a pilot despreading sequence at the predetermined rate;

performing a Fast Fourier Transform on a pilot despreading sequence;

multiplying the Fast Fourier Transform of the pilot signal samples by the Fast Fourier Transform of the despreading sequence to produce a product signal;

performing an inverse Fast Fourier Transform on the product signal to generate a cross correlation function of the CDMA pilot signal and the pilot despreading signal;

generating a power delay profile by summing the squared magnitude of the cross correlation function for each received pilot signal frames; and estimating the time of arrival in response to the power delay profile.

5. A method for determining a location of a radiotelephone comprising a transmitter and receiver, the radiotelephone operating in a radiotelephone system comprising a plurality of bases stations, each base station comprising a transmitter and receiver, the method comprising the steps of:

receiving a predetermined number of GPS signals, each signal being transmitted from a different GPS satellite;

receiving a predetermined number of base station pilot signals, each pilot signal being transmitted from a different base station;

differentially combining each pilot signal with the remaining pilot signals of the predetermined number of base station pilot signals, the combining performed with all permutations of pairs of pilot signals;

differentially combining each GPS signal with the remaining GPS signals of the predetermined number of GPS signals, the combining performed with all permutations of pairs of GPS signals; and combining the results of the pilot signal differential combination with the results of the GPS signal differential combination to determine the location of the radiotelephone.

6. An apparatus for estimating a transmitter delay in a radio frequency transmitter, the apparatus comprising:

a transmit path, coupled to an original baseband signal, comprising:
   an upconverter for changing the frequency of a signal to be transmitted, thus producing an upconverted signal;
   a power amplifier, coupled to the upconverter, for amplifying the upconverted signal to become an amplified signal; and
   a coupler, coupled to the power amplifier, for distributing the amplified signal; and a feedback path comprising:
   a local oscillator that generates a clocking signal, the local oscillator coupled to the upconverter;
   a multiplier coupled to the coupler and the local oscillator for downconverting the amplified signal to produce a reproduced baseband signal;
   a filter, coupled to the multiplier, for filtering the reproduced baseband signal to produce a filtered signal; and
   a correlator, coupled to the filter and the original baseband signal, for correlating the filtered signal with the original baseband signal to produce an estimate of the transmitter delay.

7. A receiver apparatus for receiving both a code division multiple access (CDMA) signal and a global positioning system (GPS) signal, the receiver apparatus comprising:

an antenna for receiving the CDMA and the GPS signals;

a CDMA signal receiver, coupled to the antenna, for operating on the CDMA signal;

a dual frequency synthesizer for generating a CDMA clock signal and a GPS clock signal;

a switch having a first input coupled to the CDMA clock signal, a second input coupled to the GPS clock signal, a control input, and an output for outputting either the CDMA clock signal or the GPS clock signal in response to the control input;

a switch frequency generator for generating a switching signal, the switching signal coupled to the control input of the switch;

a down-converter mixer, coupled to the antenna and the switch output, for multiplying a received signal from the antenna with either the CDMA clock signal or the GPS clock signal depending on the switching signal, the down-converter mixer outputting a commutated CDMA/GPS signal;

a narrowband filter, coupled to the down-converter mixer, for filtering the commutated CDMA/GPS signal to generate a filtered signal having a CDMA portion and a GPS portion; and a processor, coupled to the narrowband filter and the switch frequency generator, for processing the CDMA portion of the filtered signal independently of the GPS portion of the filtered signal, the processing performed in response to the switching signal.

* * * * *